US012650413B2

(12) United States Patent
Ota

(10) Patent No.: US 12,650,413 B2
(45) Date of Patent: Jun. 9, 2026

(54) CERAMIC JOINT BODY, METHOD OF MANUFACTURING THE SAME, AND MIXING MEMBER FOR LIQUID CHROMATOGRAPHY

(71) Applicant: KYOCERA CORPORATION, Kyoto (JP)

(72) Inventor: Shoichi Ota, Higashiomi (JP)

(73) Assignee: KYOCERA Corporation, Kyoto (JP)

( * ) Notice: Subject to any disclaimer, the term of this patent is extended or adjusted under 35 U.S.C. 154(b) by 985 days.

(21) Appl. No.: 17/791,363

(22) PCT Filed: Jan. 6, 2021

(86) PCT No.: PCT/JP2021/000249
§ 371 (c)(1),
(2) Date: Jul. 7, 2022

(87) PCT Pub. No.: WO2021/141057
PCT Pub. Date: Jul. 15, 2021

(65) Prior Publication Data
US 2023/0063117 A1 Mar. 2, 2023

(30) Foreign Application Priority Data

Jan. 10, 2020 (JP) ................................. 2020-002906

(51) Int. Cl.
| *G01N 30/00* | (2006.01) |
| *G01N 30/34* | (2006.01) |
| *G01N 30/02* | (2006.01) |

(52) U.S. Cl.
CPC ....... *G01N 30/34* (2013.01); *G01N 2030/027* (2013.01)

(58) Field of Classification Search
CPC ............. G01N 30/34; G01N 2030/342; G01N 2030/345; G01N 2291/0232; B01L 3/5027
See application file for complete search history.

(56) References Cited

U.S. PATENT DOCUMENTS

| 4,662,958 | A | 5/1987 | Conder et al. | |
| 2002/0084103 | A1* | 7/2002 | Komatsu ................. | H01L 23/15 |
| | | | | 257/E23.009 |
| 2004/0042340 | A1 | 3/2004 | Aso | |
| 2008/0305005 | A1 | 12/2008 | Kurokawa et al. | |
| 2009/0321356 | A1 | 12/2009 | Gerhardt et al. | |
| 2014/0345372 | A1* | 11/2014 | Gerhardt ........... | B01L 3/502715 |
| | | | | 417/43 |
| 2016/0169757 | A1 | 6/2016 | Steinke et al. | |
| 2020/0317586 | A1 | 10/2020 | Seol | |

FOREIGN PATENT DOCUMENTS

| JP | S60-500908 A | 6/1985 |
| JP | H02-97470 A | 4/1990 |
| JP | H08-225811 A | 9/1996 |

(Continued)

*Primary Examiner* — Anshu Bhatia
(74) *Attorney, Agent, or Firm* — Procopio, Cory, Hargreaves & Savitch LLP

(57) ABSTRACT

A ceramic joint body according to the present disclosure includes a plurality of ceramic substrates overlapping along a thickness direction to include a channel inside, and the plurality of ceramic substrates are diffusion bonded to each other at the opposing surfaces.

9 Claims, 5 Drawing Sheets

(56)     References Cited

FOREIGN PATENT DOCUMENTS

| | | | |
|----|----|----|----|
| JP | 2004-85431 | A | 3/2004 |
| JP | 2004-119735 | A | 4/2004 |
| JP | 2009-531665 | A | 9/2009 |
| JP | 2015-42608 | A | 3/2015 |
| JP | 2015-515383 | A | 5/2015 |
| JP | 2016-527506 | A | 9/2016 |
| WO | 2006/057408 | A1 | 6/2006 |
| WO | 2018/107022 | A1 | 6/2018 |
| WO | 2019124779 | A1 | 6/2019 |

* cited by examiner

10

3

2

1

CERAMIC JOINT BODY, METHOD OF MANUFACTURING THE SAME, AND MIXING MEMBER FOR LIQUID CHROMATOGRAPHY

TECHNICAL FIELD

The present disclosure relates to a ceramic joint body and a mixing member for liquid chromatography.

BACKGROUND ART

In liquid chromatography, a gradient elution device used for gradient analysis that continuously or stepwise changes the composition of an eluent is provided with a mixing member for mixing a plurality of eluents.

As a mixing member having a small size and capable of easily changing the mixing capacity, in Patent Document 1, a mixing member is provided in which the mixing member includes a joint body that includes a plurality of plate members joined so as to form a channel to be a mixing portion inside. The outer surface of the joint body is provided with at least two liquid supply ports for supplying eluents and a take-out port for taking out the mixed eluent, and the mixing member has a structure in which two or more plate members including formed channels inside are overlapped and two or more channels are connected in parallel.

It is described that such a plate material is made of stainless steel (e.g., SUS316, or the like) and is mechanically fixed with bolts.

CITATION LIST

Patent Literature

Patent Document 1: JP 2004-85431 A

SUMMARY

Technical Problem

In a ceramic joint body of the present disclosure, a plurality of ceramic substrates overlap along a thickness direction to include a channel inside, and the plurality of ceramic substrates are diffusion bonded to each other at opposing surfaces.

A method of manufacturing a ceramic joint body of the present disclosure includes: preparing a first ceramic substrate including a first main face and a channel located on the first main face and a second ceramic substrate including a second main face causing the first main face and the second main face to face each other; and pressing the first ceramic substrate and the second ceramic substrate from the thickness direction and performing thermal treatment.

In the present disclosure, the mixing member for liquid chromatography includes the above ceramic joint body.

DESCRIPTION OF EMBODIMENTS

The present disclosure provides a ceramic joint body for use in a mixing member, in which even when the eluent is repeatedly supplied to the mixing portion, liquid is hardly leaked from a gap between plate materials toward the outside, and the mixing member has a high corrosion resistance and can be used for a long period of time. Hereinafter, the ceramic joint body of the present disclosure will be described in detail with reference to the drawings.

Figure 1A:
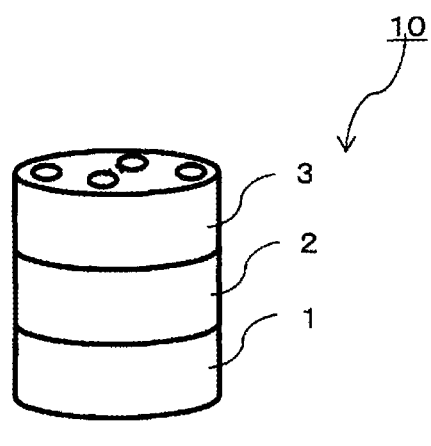
FIG. 1A is a perspective view illustrating an example of a mixing member for liquid chromatography including a ceramic joint body of the present disclosure.
Figure 1B:
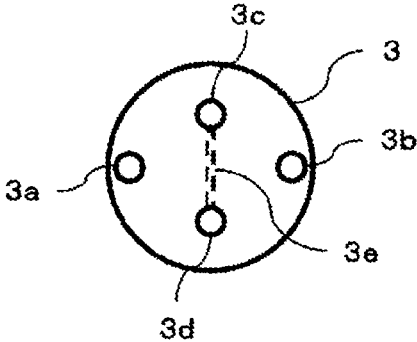
FIG. 1B is a plan view of a ceramic substrate constituting the ceramic joint body in FIG. 1A.
Figure 1C:
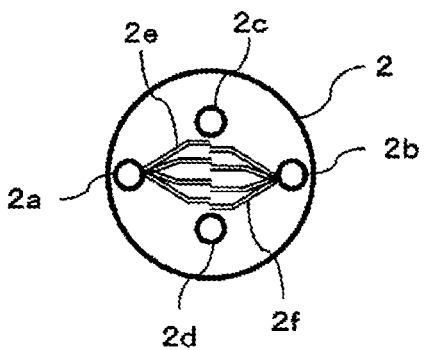
FIG. 1C is a plan view of another ceramic substrate constituting the ceramic joint body in FIG. 1A.
Figure 1D:
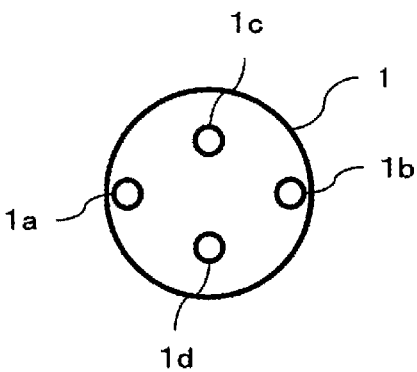
FIG. 1D is a plan view of still another ceramic substrate constituting the ceramic joint body in FIG. 1A.

FIG. 1A is a perspective view illustrating an example of a mixing member for liquid chromatography including a ceramic joint body of the present disclosure, and FIGS. 1B to 1D are plan views of respective ceramic substrates.

A ceramic joint body 10 constituting a mixing member for liquid chromatography includes at least three ceramic substrates 1, 2 and 3.

The ceramic substrate 1 includes through holes $1a$ to $1d$ penetrating in the thickness direction.

The ceramic substrate 2 includes through holes $2a$ to $2d$ penetrating in the thickness direction coaxially with the through holes $1a$ to $1d$ respectively, a channel $2e$ connected to the through hole $2a$, and a channel $2f$ connected to the through hole $2b$. The channels $2e$ and $2f$ penetrate in the thickness direction.

The ceramic substrate 3 includes through holes $3a$ to $3d$ penetrating in the thickness direction coaxially with the through holes $2a$ to $2d$ respectively, and a channel $3e$ connected to the through holes $3c$ and $3d$. The channel $3e$ communicates with the channels $2e$ and $2f$, and the side opposite to the channels $2e$ and $2f$ is blocked.

The ceramic substrates 1, 2, and 3 are, for example, disks each having a thickness of 0.1 mm to 0.5 mm. The through holes $1a$, $2a$, and $3a$ are passages for supplying an eluent A, the through holes $1b$, $2b$, and $3b$ are passages for supplying an eluent B different from the eluent A, channels $2e$, $2f$, and $3e$ are mixing portions for mixing the eluents A and B, and the through holes $1c$, $1d$, $2c$, $2d$, $3c$, and $3d$ are passages for discharging the mixed eluents A and B. At least two of the through holes $1a$, $1b$, and $1c$ of the ceramic substrate 1 also function as pin insertion holes for inserting pins for positioning the ceramic substrates before joining, and the same applies to the through holes $2a$, $2b$, and $2c$ of the ceramic substrate 2 and the through holes $3a$, $3b$, and $3c$ of the ceramic substrate 3.

In the ceramic joint body 10, the disk-shaped ceramic substrates 1, 2, and 3 are arranged in this order, and mutually opposite surfaces are diffusion bonded to each other.

In the present disclosure, "diffusion bonding" means a state of being bonded without interposing a joint layer made of glass or resin. Since the opposing surfaces of the ceramic substrates 1, 2, and 3 are in contact with each other, corrosion resistance against the eluent A and B is enhanced, and the sealing property between the opposing surfaces is enhanced, the ceramic substrates 1, 2, and 3 can be used for a long period of time even when the supply, mixing, and discharge of the eluent A and B are repeated.

Further, as illustrated in FIG. 1A, since the ceramic substrates 1, 2, and 3 of the same shape are diffusion bonded, there is no need for the substrates to be stored and fixed in a holder or the like, so that the number of parts is small and the apparatus can be miniaturized.

By changing the thickness of the ceramic substrates 2 and 3 and the width of the channels 2e, 2f and 3e, the capacity of the mixing portion can be easily changed.

A plurality of sets of the ceramic joint bodies 10, each set is the same combination as the ceramic substrates 1, 2, and 3 and consists in this order, may be arranged coaxially such that the respective through holes 1a to 1d, 2a to 2d, and 3a to 3d communicate with each other. Further, the opposing surfaces of the n-th set ceramic substrate 3 and the (n+1)-th set ceramic substrate 1 may be diffusion bonded to each other. The ceramic substrate 3 of the final set is followed by a flat plate without a through hole and a channel.

In such a configuration, the eluent A is first supplied from the through hole 1a of the first set of ceramic joint body 10, the eluent B is supplied from the through hole 1b, the mixing portion of each set mixes the eluent A and B, and finally the eluent A and B mixed from the through holes 1c and 1d of the first set is discharged.

The ceramic substrates 1, 2, and 3 illustrated in FIGS. 1A to 1D are disk-shaped, but may be square plate-shaped.

The ceramic substrates 1, 2 and 3 are composed of, for example, a ceramic including aluminum oxide, zirconium oxide or silicon carbide as a main constituent.

In particular, the ceramic substrates 1, 2, and 3 may include aluminum oxide as a main constituent, and may include 0.02 mass % to 10 mass % of silicon in terms of oxide.

When silicon is included in the range described above, the amount of silicon eluted between the opposing surfaces of the ceramic substrates 1, 2, and 3 by the thermal treatment in the bonding becomes an appropriate amount, so that the bonding strength between the ceramic substrates can be increased.

Additionally, the ceramic substrates 1, 2, and 3 may each include 0.02 mass % to 1.2 mass % magnesium in terms of oxide and 0.02 mass % to 3 mass % calcium in terms of oxide.

When magnesium and calcium are included in the above range, the temperature of the thermal treatment in the bonding can be set low, and the residual thermal stress can be reduced.

When magnesium and calcium are included in the above range, the temperature of the thermal treatment in the bonding can be set low, and the residual thermal stress can be reduced.

It is preferable that respective end portion sides of the ceramic substrates 1 and 3 located on both sides in the thickness direction include less silicon, magnesium and calcium in terms of oxide than the ceramic substrate 2 sandwiched between the ceramic substrates 1, 3 located on both sides.

The end portions of the ceramic substrates 1 and 3 are each in contact with a holder made of a metal described later, and each contact area thereof is larger than the contact area with the ceramic substrate 2. When the respective end portions of the ceramic substrates 1 and 3 include a small amount of each oxide of the above elements that may corrode the holder, the elution amount of the oxide of each element become small, so that the holder can be used for a long period of time.

When the ceramic substrate 1 is placed on a support for thermal treatment (not illustrated) and a weight is placed on the ceramic substrate 3, and then thermal treatment is performed, the possibility that the support for thermal treatment and the weight adhere to the ceramic joint body after thermal treatment is reduced, whereby the ceramic joint body can be easily taken out.

On the other hand, since the ceramic substrate 2 includes a higher content of each element in terms of an oxide than the respective end portions of the ceramic substrates 1 and 3, recrystallization of each element with aluminum oxide by the oxide is promoted, and the bonding strength to each of the ceramic substrates 1 and 3 can be increased.

Here, the end portion side of the ceramic substrate 1 refers to a range of 75% of the wall thickness of the ceramic substrate 1 in the thickness direction from the lower surface of the ceramic substrate 1. The end portion side of the ceramic substrate 3 refers to a range of 75% of the thickness of the ceramic substrate 3 in the thickness direction from the upper surface of the ceramic substrate 3.

The content of silicon on each of the end portion sides of the ceramic substrates 1 and 3 in terms of oxide is, for example, 0.02 mass % to 0.04 mass %, and the difference from the content of silicon included in the ceramic substrate 2 in terms of oxide is, for example, 8 mass % or more.

The content of magnesium on each of the end portion sides of the ceramic substrates 1 and 3 in terms of oxide is, for example, 0.02 mass % to 0.06 mass %, and the difference from the content of magnesium included in the ceramic substrate 2 in terms of oxide is, for example, 0.4 mass % or more.

The content of calcium on each of the end portion sides of the ceramic substrates 1 and 3 in terms of oxide is, for example, 0.02 mass % to 3 mass %, and the difference from the content of calcium included in the ceramic substrate 2 in terms of oxide is, for example, 1.5 mass % or more.

The end portion sides of the ceramic substrates 1 and 3 located on both sides in the thickness direction may each include less magnesium aluminate than the ceramic substrate 2 sandwiched between the ceramic substrates 1 and 3 located on both sides. Since the elution amount of magnesium aluminate by the eluent becomes small, so that the holder can be used for a long period of time. Further, since the possibility that the support for thermal treatment and the weight adhere to the ceramic joint body after thermal treatment is reduced, the ceramic joint body can be easily taken out.

The main constituent in ceramic is a constituent that accounts for 60 mass % or more of the total 100 mass % of the constituents constituting the ceramic of interest. In particular, the main constituent may preferably be a constituent that accounts for 88 mass % or more of the total 100 mass % of the constituents constituting the ceramic of interest. The constituents constituting the ceramic may be obtained by using an X-ray diffractometer (XRD). For the content of each constituent, after the constituent is identified, the content of elements constituting the constituent is determined using a fluorescence X-ray analyzer (XRF) or an ICP emission spectrophotometer, and may be converted into the identified constituent.

A mixing member for liquid chromatography including a ceramic joint body is produced in such a manner that the ceramic substrates 1, 2, and 3 are located in a predetermined position where the through holes 1a to 1d, 2a to 2d, and 3a to 3d penetrate in this order, respectively.

Figure 2:
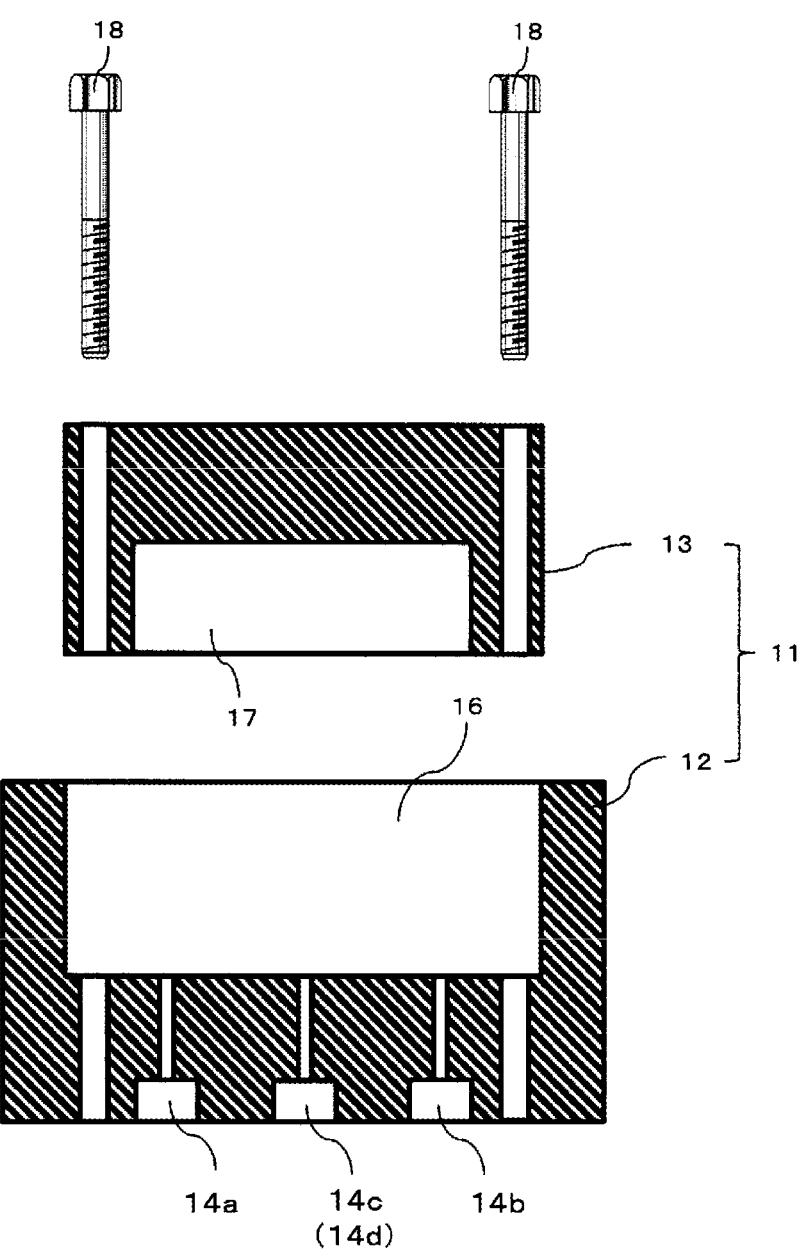
FIG. 2 is a cross-sectional view illustrating an example of a holder to which the mixing member for liquid chromatography illustrated in FIG. 1A is attached.

FIG. 2 is a cross-sectional view illustrating an example of a holder to which the mixing member for liquid chromatography illustrated in FIG. 1 is attached.

A plurality of the mixing members for liquid chromatography are attached to the holder 11. The holder 11 includes a connecting portion 12 and a support portion 13, both of which are formed of, for example, metal (e.g., stainless steel such as SUS 316L). The connecting portion 12 includes connecting openings 14*a* to 14*d* and an attaching portion 16 for attaching the support portion 13. The support portion 13 includes a recessed portion 17 that houses a mixing member for liquid chromatography. After the plurality of mixing members for liquid chromatography are housed in the recessed portion 17, the support portion 13 is installed in the attaching portion 16 such that the connecting openings 14*a* to 14*d* and the through holes 1*a* to 1*d*, 2*a* to 2*d*, and 3*a* to 3*d* are aligned in radial positions, respectively. The connecting portion 12 and the support portion 13 are fixed by fastening members such as bolts 18.

In the above, it is described that the ceramic joint body 10 constituting the mixing member for liquid chromatography includes at least three ceramic substrates 1, 2, and 3. But this is not the only case, and the ceramic joint body 10 may be configured that the first ceramic substrate including a first main face and channels located on the first main face and the second ceramic substrate including the second main face may overlap along the thickness direction, and the first main face, and the second main face may be diffusion bonded. In this case, for example, one of the ceramic substrates 2 and 3 illustrated in FIG. 1 is the first ceramic substrate and the ceramic substrate 1 is the second ceramic substrate.

One of the pin insertion holes of the ceramic substrates 2 and 3 is a first pin insertion hole, and the pin insertion hole of the ceramic substrate 1 is a second pin insertion hole.

Next, an example of a method of manufacturing a ceramic joint body and a mixing member for liquid chromatography according to the present disclosure will be described.

When the main constituent of the ceramic is aluminum oxide, aluminum oxide powder (purity: 99.9 mass % or more), which is the main constituent, and each powder of silicon oxide, magnesium hydroxide, and calcium carbonate is charged together with a solvent (ion-exchanged water) into a mill for grinding, and after grinding until the average particle diameter ($D_{50}$) of the powder becomes 1.5 µm or less, an organic binder and a dispersing agent for dispersing the aluminum oxide powder are added and mixed to obtain a slurry.

Here, the total of 100 mass % of the above powders includes from 0.02 to 10 mass % of silicon oxide powder, from 0.03 to 1.7 mass % of magnesium hydroxide powder, from 0.03 to 5.35 mass % of calcium carbonate powder, and the remainder is aluminum oxide powder and inevitable impurities.

The organic binder is an acrylic emulsion, polyvinyl alcohol, polyethylene glycol, polyethylene oxide, or the like.

Next, the slurry is sprayed and granulated to obtain granules, which are then pressurized to a molding pressure of 78 MPa to 128 MPa by using a one shaft press molding apparatus to obtain a disk-shaped powder compact. Then, a disc-shaped powder compact is machined, and after firing, a prepared hole to be a through hole is formed by machining.

Next, the ceramic substrate is obtained by firing a plurality of powder compacts including prepared holes at a firing temperature of 1500° C. to 1700° C. and a holding time of 4 to 6 hours.

To obtain a ceramic substrate including a channel, the channel may be formed by laser machining process.

Here, before water is adhered to at least one of the opposing surfaces of the ceramic substrates, it may be grinded or polished by using diamond abrasive grains having an average particle diameter $D_{50}$ of, for example, 2 µm or less, and in particular, the flatness of the opposing surface of the polished ceramic substrate may preferably be 1.5 µm or less. Polishing activates the hydrolysis reaction of the polished surface, resulting in a stronger bonding. The adhered water can bring the opposing surfaces into close contact with each other by surface tension, and the elements other than Al (Si, Mg, and Ca) induced by the hydration reaction (local hydrolysis reaction of OH group by $H_2O$ with little impurities) are recrystallized with aluminum oxide by the difference in electronegativity to obtain a strong bonding.

The mixing member for liquid chromatography including the ceramic joint body according to the present disclosure can be obtained by attaching water to at least one of the opposing surfaces of the ceramic substrates facing each other, causing the opposing surfaces to face each other, inserting a pin for positioning into the through hole as a pin insertion hole, and then pressing from the thickness direction and thermal treating the ceramic joint body. The temperature of the thermal treatment may be, for example, 1000° C. to 1800° C., particularly 1700° C. to 1800° C., and the duration of the thermal treatment may be, for example, 30 minutes to 120 minutes. Further, the pressure required for pressing is not limited and is appropriately set according to the size and material of the ceramic substrate. Specifically, it is preferable to press at a pressure of 0.01 MPa to 0.04 MPa.

When thermal treatment is performed by using a support for thermal treatment and a weight, these may preferably be sapphire or ceramic having a content of aluminum oxide of 99.5 mass % or more.

When the support for thermal treatment and the weight are sapphire or the ceramic, the glass constituent is reduced, so that the possibility of adhering to the ceramic joint body after thermal treatment is reduced.

The mixing member for liquid chromatography obtained by the manufacturing method described above has high corrosion resistance to the eluent A and B and high sealing property between the opposed surfaces, so that the mixing member can be used for a long period of time even when the eluent A and B are repeatedly supplied, mixed and discharged.

The present disclosure is not limited to the embodiments described above, and various modifications and improvements may be made within the scope of the claims.

REFERENCE SIGNS LIST

10 Ceramic joint body
1 Ceramic substrate
2 Ceramic substrate
3 Ceramic substrate

The invention claimed is:

1. A ceramic joint body comprising:

a plurality of ceramic substrates overlapping along a thickness direction to comprise a channel inside, the plurality of ceramic substrates being diffusion bonded to each other at opposing surfaces, wherein the plurality of ceramic substrates each comprise aluminum oxide as a main constituent, and each comprise from 0.02 mass % to 10 mass % of silicon in terms of oxide, the plurality of ceramic substrates include at least three ceramic substrates that overlap along the thickness direction, and end portion sides of the ceramic substrates located on both sides in the thickness direction each comprise less silicon in terms of oxide than the ceramic substrate sandwiched between the ceramic substrates located on both sides.

2. The ceramic joint body according to claim 1, wherein the plurality of ceramic substrates each comprise from 0.02 mass % to 1.2 mass % magnesium in terms of oxide, and each comprise from 0.02 mass % to 3 mass % calcium in terms of oxide.

3. A ceramic joint body comprising:

a plurality of ceramic substrates overlapping along a thickness direction to comprise a channel inside, the plurality of ceramic substrates being diffusion bonded to each other at opposing surfaces, wherein the plurality of ceramic substrates each comprise aluminum oxide as a main constituent, and each comprise from 0.02 mass % to 10 mass % of silicon in terms of oxide, the plurality of ceramic substrates include at least three ceramic substrates that overlap along the thickness direction, and end portion sides of the ceramic substrates located on both sides in the thickness direction each comprise less magnesium in terms of oxide than the ceramic substrate sandwiched between the ceramic substrates located on both sides.

4. A ceramic joint body comprising:

a plurality of ceramic substrates overlapping along a thickness direction to comprise a channel inside, the plurality of ceramic substrates being diffusion bonded to each other at opposing surfaces, wherein the plurality of ceramic substrates each comprise aluminum oxide as a main constituent, and each comprise from 0.02 mass % to 10 mass % of silicon in terms of oxide, the plurality of ceramic substrates include at least three ceramic substrates that overlap along the thickness direction, and the end portion sides of the ceramic substrates located on both sides in the thickness direction each comprise less calcium or less magnesium in terms of oxide than the ceramic substrate sandwiched between the ceramic substrates located on both sides.

5. A method of manufacturing ceramic joint body of claim 1, the method comprising:

preparing a first ceramic substrate comprising a first main face and a channel located on the first main face and a second ceramic substrate comprising a second main face;

causing the first main face and the second main face to face each other; and pressing the first ceramic substrate and the second ceramic substrate from a thickness direction and performing thermal treatment.

6. The method of manufacturing a ceramic joint body according to claim 5, wherein the first main face and the second main face are grinded or polished in advance prior to the causing them to face each other.

7. The method of manufacturing a ceramic joint body according to claim 5, wherein the first ceramic substrate and the second ceramic substrate each comprise aluminum oxide as a main constituent, and each comprise silicon, magnesium and calcium, and a total content of silicon, magnesium and calcium in the second ceramic substrate is less than in the first ceramic substrate.

8. The method of manufacturing a ceramic joint body according to claim 5, wherein the first ceramic substrate comprises a first pin insertion hole in the thickness direction, the second ceramic substrate comprises a second pin insertion hole in the thickness direction, and the first ceramic substrate and the second ceramic substrate are thermally treated with a pin inserted to communicate with the first pin insertion hole and the second pin insertion hole.

9. A mixing member for liquid chromatography, the mixing member comprising the ceramic joint body according to claim 1.

\* \* \* \* \*